United States Patent [19]

Stork et al.

[11] Patent Number: 4,704,080

[45] Date of Patent: Nov. 3, 1987

[54] MATRIX FOR THE PRODUCTION OF PELLETS

[75] Inventors: Kurt Stork, Neustadt/Donau; Peter Reitsamer, Waldkraiburg, both of Fed. Rep. of Germany; Richard Schultz, Mörschwil, Switzerland

[73] Assignee: SKW Trostberg Aktiengesellschaft, Trostberg, Fed. Rep. of Germany

[21] Appl. No.: 898,238

[22] Filed: Aug. 20, 1986

[30] Foreign Application Priority Data

Aug. 29, 1985 [DE] Fed. Rep. of Germany ....... 3530844

[51] Int. Cl.[4] ........................ B29B 9/06

[52] U.S. Cl. ........................ 425/314; 264/142; 425/331; 425/DIG. 230

[58] Field of Search ............... 425/314, 310, 311, 376, 425/378 R, 378 S, 461, 463, 464, 298, 309, 308, 310, 311, 331, 67, DIG. 230; 264/142, 148

[56] References Cited

U.S. PATENT DOCUMENTS 2,603,170 1/1952 Meakin ........................ 425/314

FOREIGN PATENT DOCUMENTS 812774 9/1951 Fed. Rep. of Germany .
2913457 10/1979 Fed. Rep. of Germany .
3342659 6/1985 Fed. Rep. of Germany .

*Primary Examiner*—Jay H. Woo
*Assistant Examiner*—Karl D. Sturge
*Attorney, Agent, or Firm*—Felfe & Lynch

[57] ABSTRACT

The present invention provides a matrix for the production of pellets from powdered, granular, fibrous or precompressed loose material, said matrix having a plurality of pressure canals passing therethrough through which the loose material is forced and having cutting means which divides up the pressed material emerging from the pressure canals into pellets of predetermined length, wherein, on the exit side of the matrix, there are present flanges running between the pressure canals with a constant distance from one another, between which flanges sections of the cutting means extend up to the exit ends of the pressure canals.

7 Claims, 5 Drawing Figures

MATRIX FOR THE PRODUCTION OF PELLETS

The present invention is concerned with a matrix for the production of pellets from powdered, granular, fibrous or pre-compressed loose material, said matrix having a plurality of pressure canals passing therethrough through which the loose material is forced and having cutting means which divides up the pressed material emerging from the pressure canals into pellets of predetermined length. Such pellets can be used, for example, in the foodstuff industry and for the extraction of naturally-occurring materials.

From Federal Republic of Germany Patent Specification No. 32 35 847, it is known to pelletise material containing naturally-occurring materials for extraction with the use of supercritical gases. The advantages of such pellets in comparison with powdered products include a higher bulk density and practically no canal formation by the supercritical gases in the material to be extracted. However, pellets which are relatively short and have a small diameter are difficult to produce. In order to produce small pellets, it is known to use matrices with pressure canals of relatively small diameter, the ratio of length to diameter being of decisive importance for the strength of the pellets. If it is desired to produce relatively small pellets, the length of the pressure canals must be correspondingly short in order that inadmissibly high temperatures do not result in the material to be pressed. However, for reasons of stability, such short pressure canals necessitate relatively thick-walled matrices if the number of pressure canals is not to be reduced, which would reduce the throughput of material to be pressed.

In order to overcome these difficulties, it is known from U.S. Pat. No. 2,059,486 to make the diameters of the pressure canals smaller on the entry side than on the exit side. The increasing of the diameter can thereby be conical or stepwise. In this way, it is to be achieved that the material to be pressed is first compressed in the narrower cross-sections of the pressure canals and subsequently passes freely into the wider sections of the pressure canals. However, in practice, it has been found that the pressed material, after leaving the narrower sections of the pressure canals, again expands and the pellets then assume the undesired larger diameter of the further sections of the pressure canals. It then results, over the whole length of the pressure canals, in friction with the matrix material which gives rise to a considerable heating of the pressed material and, especially in the case of temperature sensitive natural materials, such as hops, can lead to irreversible changes of the component materials.

Therefore, it is an object of the present invention to provide a matrix of the initially-mentioned type with which short pellets of small diameter, which have a great strength, can be produced economically without considerable heating of the material to be pressed.

Thus, according to the present invention, there is provided a matrix for the production of pellets from powdered, granular, fibrous or pre-compressed loose material, said matrix having a plurality of pressure canals passing therethrough through which the loose material is forced and having cutting means which divides up the pressed material emerging from the pressure canals into pellets of predetermined length, wherein, on the exit side of the matrix, there are present flanges running between the pressure canals with a constant distance from one another, between which flanges sections the cutting means extend up to the exit ends of the pressure canals.

The thickness of the flanges depends upon the diameter and the length of the pressure canals. For preferred pellets of 1 to 10 mm. diameter and 2 to 50 mm. length, the most favourable thickness of the flanges is from 1 to 15 mm. and preferably from 3 to 7 mm. These values represent a compromise between the available matrix surface, on the one hand, and the necessary stability of the matrix, on the other hand. The distance between the individual flanges is also essentially dependent upon the diameter of the pressure canals. Therefore, in the case of diameters of the pressure canals of from 1 to 5 mm., there are preferably 1 to 20 rows of pressure canals between the individual flanges. Here, too, similarly to the case of the thickness of the strengthening flanges, a balance must be made between sufficient stability of the matrix, which means the same thing as a small distance between the flanges, and the greatest possible utilization of the matrix surface (large distance between the flanges). Furthermore, it must thereby be taken into account that the distance between the flanges is so great that there is sufficient room for the cutting means which must extend directly up to the end of the pressure canals.

That the cutting means between the flanges extends directly up to the exit ends of the pressure canals is especially important. It is thereby achieved that the pressed bodies, immediately after leaving the pressure canals, are brought to the desired length.

The height of the flanges also exerts an influence on the stability of the matrix. Therefore, the height of the flanges should exceed the 1.3 fold length of the pressure canals. Normally, the flanges have a height of from 10 to 100 mm.

The surfaces of the flanges usually suffice in order to provide a sufficient cooling due to their contact with the air. If necessary, in the case of material to be pressed which is very temperature sensitive, additional cooling can be provided in the form of a cooling bath through which the flanges are passed when the matrix is rotated.

The present invention will now be explained in more detail in the following Example, reference being made to the accompanying drawings in which.

Figure 3:
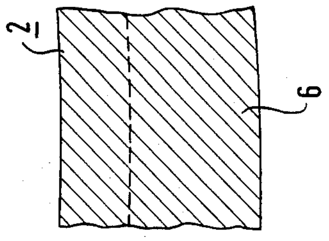
FIG. 3 is a section along the line III—III in FIG. 1.
Figure 1:
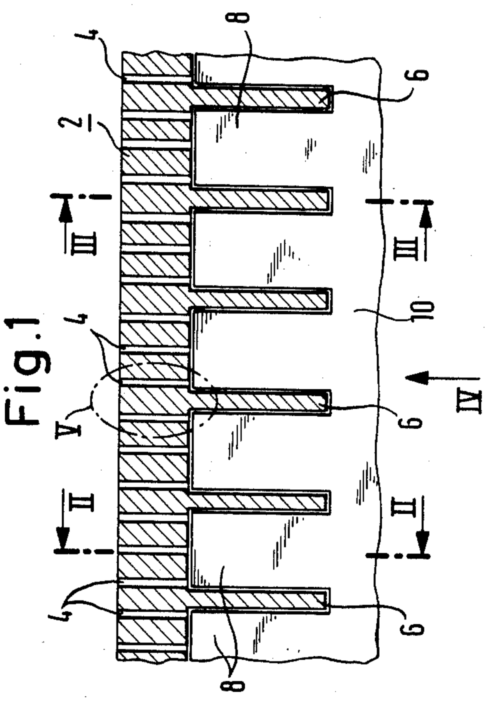
FIG. 1 is a longitudinal section through the hollow cylindrical matrix.
Figure 4:
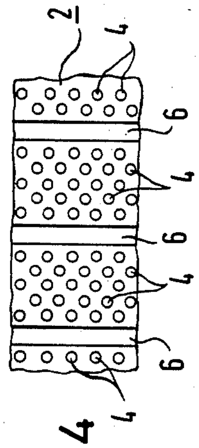
FIG. 4 is a view along the line IV in FIG. 1.
Figure 2:
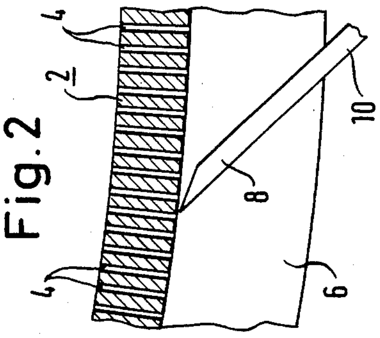
FIG. 2 is a section along the line II—II in FIG. 1.
Figure 5:
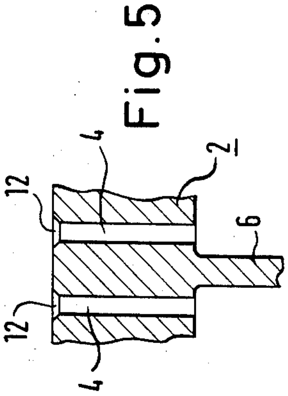
FIG. 5 is an enlarged view of the region V of FIG. 1.

The matrix 2 is in the form of a hollow cylinder, the curvature of which can be seen from FIG. 2. In the matrix, there are provided rows of pressure canals 4 running in the circumferential direction. As can be seen from FIG. 4, adjacent rows of pressure canals are staggered with regard to each other. In the illustrated embodiment, between, in each case, five rows of pressure canals 4, there are provided, on the outer side of the matrix 2, flanges 6 about the periphery which radially extend therefrom. Between the flanges, there engage cutters 8 which extend up to the exit ends of the pressure canals 4 but start from a common cross bar 10. The inner ends of the pressure canals 4 are provided with sockets 12.

What is claimed is:

1. An apparatus for the production of pellets from powdered, granular, fibrous or precompacted bulk material, comprising a hollow cylindrical matrix which has in the circumferential direction a plurality of rows of through-going pressing passages through which the bulk material is forced radially from the inside out; knives to divide the pressed material emerging from the pressing channels into pellets of predeterminable length, said knives being disposed on the outside of the matrix extending transversely of the circumferential direction of the matrix; cooling flanges situated on the outside of the matrix between the rows of the pressing passages and extending between the rows in the circumferential direction of the matrix, said flanges having a constant spacing from one another, between which flanges the knives extend to the exit ends of the pressing passages, said knives extending from a cross rail running radially outside of the flanges.

2. The apparatus of claim 1, wherein the thickness of the flanges of the matrix is from 1 to 15 mm.

3. The apparatus of claim 2, wherein the thickness of the flanges of the matrix is from 3 to 7 mm.

4. The apparatus of claim 1 wherein the matrix has from 1 to 20 rows of pressure canals between adjacent flanges.

5. The apparatus of claim 1 wherein the matrix has a ratio of the height of the flanges to the fold length of the pressure canals is at least 1.3.

6. The apparatus of claim 1 wherein the flanges of the matrix have a height of from 10 to 100 mm.

7. The apparatus of claim 1 wherein the inner ends of the pressure canals of the matrix are provided with sockets.

* * * * *